United States Patent [19]

Griffiths et al.

[11] Patent Number: 5,721,657
[45] Date of Patent: Feb. 24, 1998

[54] LOAD CONTROL MODULE

[75] Inventors: Gregory Mark Griffiths, The Junction; Eric Gayne Gibbons, New Lambton; Roman Fidyk, Adamstown Heights; John William Weaver, Valentine, all of Australia

[73] Assignee: Metal Manufactures Limited, Sydney, Australia

[21] Appl. No.: 600,939

[22] PCT Filed: Aug. 23, 1994

[86] PCT No.: PCT/AU94/00492

§ 371 Date: Aug. 20, 1996

§ 102(e) Date: Aug. 20, 1996

[87] PCT Pub. No.: WO95/06349

PCT Pub. Date: Mar. 2, 1995

[30] Foreign Application Priority Data

Aug. 24, 1993 [AU] Australia .................. PM 0808

[51] Int. Cl.$^6$ .................................................. H02H 3/00
[52] U.S. Cl. ...................... 361/93; 361/115; 361/78
[58] Field of Search ..................... 361/18, 93, 115, 361/42, 78

[56] References Cited

U.S. PATENT DOCUMENTS

| | | | |
|---|---|---|---|
| 3,347,209 | 10/1967 | Groat | 118/500 |
| 4,011,483 | 3/1977 | Meadows | 361/47 |
| 4,090,088 | 5/1978 | McMahon et al. | 307/38 |
| 4,228,475 | 10/1980 | Sherwood | 361/47 |
| 4,300,182 | 11/1981 | Schweitzer, III | 361/79 |
| 4,415,850 | 11/1983 | Sherwood | 324/51 |
| 4,788,977 | 12/1988 | Farin et al. | 128/303.13 |
| 4,803,592 | 2/1989 | Ashley | 361/79 |
| 4,809,125 | 2/1989 | Matsko et al. | 361/93 |
| 4,942,313 | 7/1990 | Kinzel | 307/326 |
| 5,255,148 | 10/1993 | Yeh | 361/93 |

FOREIGN PATENT DOCUMENTS

| | | | |
|---|---|---|---|
| 2417571 | 7/1972 | Australia | H02H 1/00 |
| 5561380 | 8/1980 | Australia | C05B 19/18 |
| B 73511/81 | 2/1982 | Australia | H02H 3/32 |
| 8266582 | 11/1982 | Australia | H02H 3/08 |
| 2920589 | 7/1989 | Australia | G05B 19/02 |
| 4461989 | 3/1990 | Australia | G05B 15/02 |
| 6649790 | 4/1991 | Australia | G05B 11/01 |
| B 10582/92 | 8/1992 | Australia | H02H 3/08 |
| 0 250 932 A1 | 1/1988 | European Pat. Off. | G05F 1/569 |
| 0 589 347 A2 | 3/1994 | European Pat. Off. | H02H 3/00 |
| 3247209 | 7/1985 | Germany | H02H 11/00 |
| 4124190 A1 | 1/1993 | Germany | H02H 3/33 |

(List continued on next page.)

OTHER PUBLICATIONS

Mittra et al., "Thermistor Based Pilot Relay Scheme for Protection of Coal Face Electrical Drives", Mining Technology, Jan. 1987, pp. 5–7.

Scientechnic Article, "Intrinsically Safe Remote Control Relay Relay Type R.O.A.". (Jul. 1980).

Coal Mines Regulation Act, 1982—Notice of Approval, Approval No.: MDA Ex.ib 1822, File No.: M86/6215, Aug. 11, 1987.

Sprecher+Schuh, Electronic Motor Protection Unit CET 3 Brochure, (Jun. 1984).

(List continued on next page.)

*Primary Examiner*—Brian K. Young
*Assistant Examiner*—Stephen Jackson
*Attorney, Agent, or Firm*—Leydig, Voit & Mayer, Ltd.

[57] ABSTRACT

A load control module (1) for controlling switch gear (2) which, in use, connects a power source (3) to remotely located electrical load (4). The module (1) includes a sensor unit (9) associated with the load (4) for providing a signal indicative of predetermined operating parameters of the load and a controller (10) for receiving the signal and for selectively providing another signal to the switch gear (2) which isolates the load (4) from the power source (3) when the load (4) does not comply with required operating parameters.

7 Claims, 1 Drawing Sheet

FOREIGN PATENT DOCUMENTS

| | | | |
|---|---|---|---|
| 1549313 | 7/1979 | United Kingdom | H02H 3/00 |
| 2 072 443 | 9/1981 | United Kingdom | H02H 3/00 |
| 2 097 613 | 11/1982 | United Kingdom | H02H 3/00 |
| 2167924 | 6/1986 | United Kingdom | H04B 5/00 |
| 2 177 561 | 1/1987 | United Kingdom | H02H 3/00 |
| 2 228 377 | 8/1990 | United Kingdom | H02H 3/00 |
| 9105293 | 4/1991 | WIPO | G05B 15/00 |

OTHER PUBLICATIONS

Scientechnic Brochure: Earth Leakage Relay for A.C. Currents Relay Type E.L.C., N.S.W. Mines Dept. Approval No. MDA-2102.

Ampcontrol User Manual for IPA Protection Module "Scientechnic IPA Integrated Protection Relay", Version IPA4VO4, Issue 1, Nov. 1, 1993.

Scientechnic DSLI-P Brochure—Digital Signal Location Indicator with PLC Interface. (date unknown).

Bramco Brochure: Control & Protection Module Model CPM2, manufactured by Bramco Electronics. (date unknown).

Australian Standard 2081.1–1988, "Electrical Equipment for Coal and Shale Minew—Electrical Protection Devices", Part 1 General Requirements. (1988).

1

LOAD CONTROL MODULE

TECHNICAL FIELD

The present invention relates to a load control module and in particular to a load control module for controlling switch gear which, in use, connects a power source to a remotely located electrical load.

The invention has been developed primarily for use in underground mining environments and will be described hereinafter with reference to that application. However, it will be appreciated that the invention is not limited to that particular field of use and is also suitable for providing load control for most electrically powered devices such as motors, transformers and the like in both mining and above ground applications.

BACKGROUND ART

Hitherto, high power electrical equipment such as motors and transformers have been connected to a power source via a switch gear. This switch gear is in general set up for a particular piece of equipment so that once certain predetermined load characteristics vary sufficiently the power will be disconnected to prevent any potentially hazardous conditions which may result in the loss of equipment or life. Any set up or adjustment of the switch gear must be manually performed which, due to operator fatigue or inadvertence, may result in incorrect adjustment.

In underground mining applications the switch gear is preferably located within a protective housing to ensure that any sparks generated during switching are not available to ignite flammable gases such as methane which may be present. Such housings include walls formed from thick steel plate and which are accessible through an opening which is closed by a door. Such doors are generally attached about their periphery to an adjacent wall by a plurality of spaced apart bolts. Accordingly, to set up or adjust the switch gear for a particular piece of equipment necessitates the opening of the steel door by removing all the bolts, the setting of the switch gear, and the subsequent replacement of the door. Following this procedure testing should be conducted to ensure safe operation. If the switch gear is not correctly set this process must be repeated. Accordingly, any reconfiguration is both time consuming and labour intensive.

It is an object of the present invention, at least in its preferred embodiment, to overcome or substantially ameliorate at least some of these deficiencies of the prior art.

DISCLOSURE OF INVENTION

According to the invention there is provided a load control module for controlling switch gear which, in use, connects a power source to a remotely located electrical load, the module including:

a sensor unit associated with the load for providing a first signal indicative of predetermined operating parameters of the load; and a controller for receiving said first signal and for selectively providing a second signal to the switch gear to isolate the load from the power source when said load does not comply with said parameters.

Preferably, the switch gear and the controller are located within a protective housing and the sensor unit and load are disposed outside the housing.

Preferably also, the sensor unit periodically provides a third signal indicative of predetermined load conditions. More preferably, the sensor unit provides the third signal when requested by the controller.

In a preferred form, the controller and sensor unit communicate through a single wire communication link which also supplies power to the sensor unit. More preferably, the switch gear selectively connects the power source to the load via an appropriate power cable, the cable including the communication link.

BRIEF DESCRIPTION OF DRAWING

A preferred embodiment of the invention will now be described, by way of example only, with reference to the accompanying drawing in which.

BEST MODE OF CARRYING OUT THE INVENTION

Figure 1:
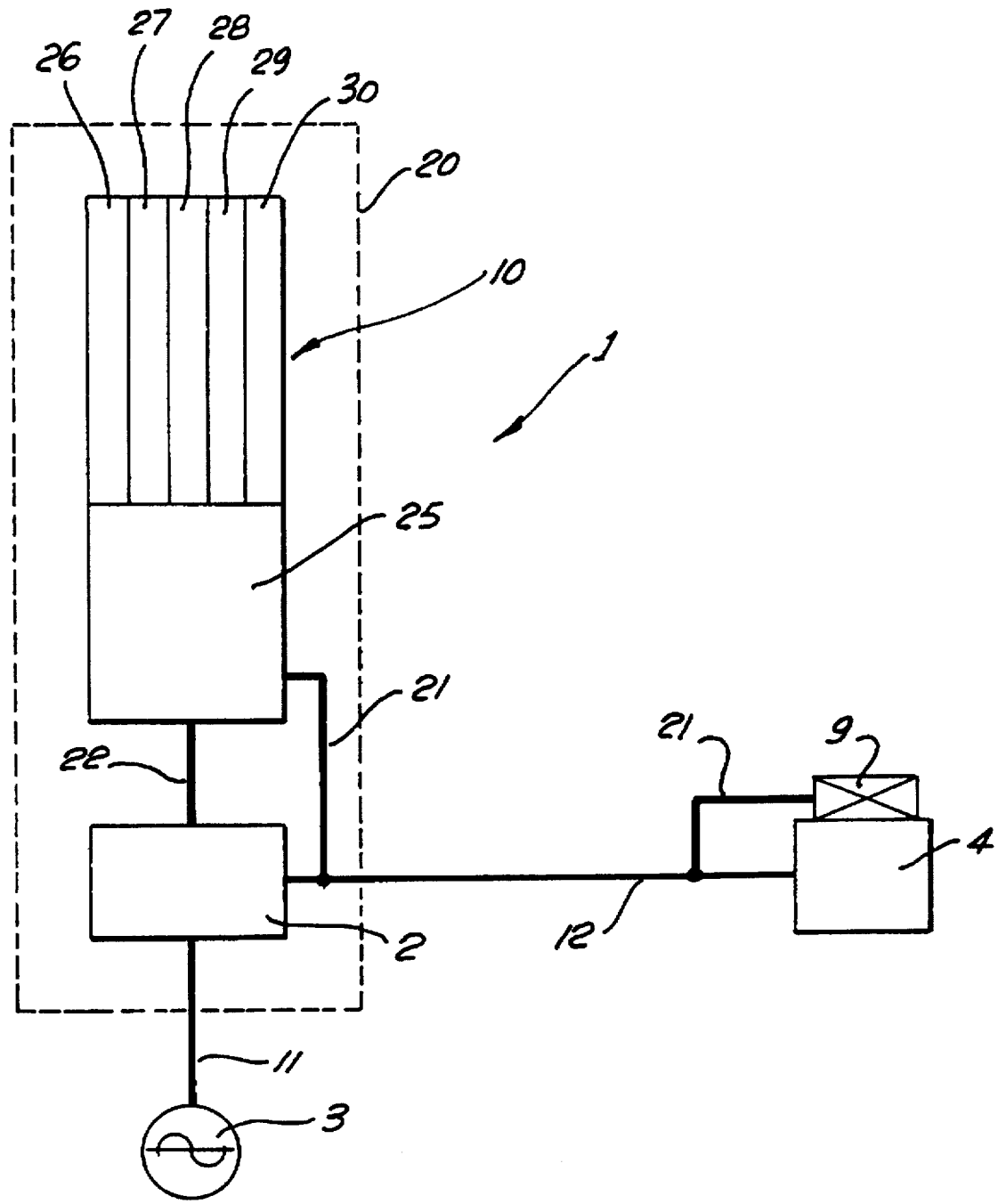
FIG. 1 is a schematic representation of a control module according to the present invention.

Referring to the drawing (not to scale), a load control module 1 controls switch gear 2 which, in use, connects an AC power source 3 to a remotely located load 4 which can be a motor, transformer, any other piece of electrical equipment or a number of pieces of such equipment. Module 1 includes a sensor unit 9 which is mounted on load 4 for providing a first signal indicative of predetermined operating parameters of the load. A controller 10 disposed adjacent switch gear 2 receives the first signal and selectively provides a second signal to the switch gear to isolate load 4 from source 3 when the load does not comply with the operating parameters.

Power source 3 is connected to switch gear 2 by a supply bus 11 which is appropriately configured for the intended current and voltage load. Similarly, switch gear 2 is connected to load 4 by way of cable 12 which is single or multiphase cable, as required.

Switch gear 2 is configured, in normal use, for electrically connecting bus 11 and cable 12 to provide electrical power to load 4. In this embodiment switch gear 2 includes a main and an auxiliary contactor, however, switches, tripping devices or other circuit breakers or the like can be utilised. Both the contactors are responsive to respective relays which in turn are responsive to signals provided by controller 10. It will also be appreciated that oil, air blast or other circuit breakers are also applicable particularly in high power applications.

In this embodiment controller 10 is contained within a casing having dimensions in the order of 235 mm×105 mm×180 mm, which, together with switch gear 2, is located within a protective housing 20 which is schematically illustrated by a broken line. This housing is preferably constructed from steel sheets of sufficient strength to resist blast and fire damage. This is particularly important in underground mining applications where explosive gases may be present.

Controller 10 is powered by an infallible transformer rated at 18 VA and having a 110 V primary/dual 18 V secondaries. This transformer must be separately mounted.

Sensor unit 9 and controller 10 communicate via cable 21 which extends within the outer insulation of cable 12. Preferably, this cable 21 constitutes a single wire communication link and a power supply cable for unit 9.

The controller includes inputs and outputs which are configured for 110 V AC control systems. Most preferably, the outputs 22 are by way of relay contacts and are rated at a maximum continuous current of 5 Amps. A plurality of indication outputs (not shown) are preferably suitable for 24 V DC systems such as LED's and PLC inputs. These indication outputs are preferably switched by opto-isolators.

The controller, in this embodiment, includes six printed circuit boards 25, 26, 27, 28, 29 and 30 which support various hardware. Main board 25 is linked to each of the other boards by way of polarised ribbon connectors or wires which are of differing sizes to ensure correct connection. All these boards include printed tracks which have been configured specifically to provide adequate current capacity while also being provided with sufficient voltage clearance between adjacent tracks. It will be appreciated that some tracks are isolated by earth tracks to ensure fail safe operation.

Main board 25 supports a central processor (not shown) which can request predetermined signals from sensor unit 9. Once obtained these signals are subsequently processed to provide information to boards 26, 27, 28, 29 and 30. Board 26 supports, amongst others, a driver for an LCD display, any additional non-volatile memory capacity and, if required, an RS-232 communications link. That is, the data obtained by the central processor can be displayed directly and/or communicated to a remotely located display. This feature of the invention facilitates central monitoring of a plurality of such controllers as well as allowing access of relevant information to on-site personnel for testing and/or determining the status of the load parameters. An example of the parameters which can be obtained and/or displayed are: power on; short circuit; overload; phase failure; locked rotor; undercurrent; earth leakage; high temperature; frozen contactor; earth fault lockout; earth continuity fault; or main contactor auxiliary relay on.

Board 27 contains the necessary drivers for the LCD graphics screen. Board 28 contains any additional warning or status indicators, reset push buttons and test buttons. Board 29 is a through connection from the current transformer inputs to board 26. The componentry is required to ensure the inputs are infallible under a fault condition. The remaining board, board 30, contains components that ensure the unit remains operational for at least two seconds after removal of power to ensure false tripping does not occur.

Sensor unit 9 is generally disposed within a casing typically having approximate dimensions of 170 mm×27 mm×70 mm and can be mounted on the load or within the load housing, as the case may be. The sensor unit includes a local processor which, when instructed by the central processor located in board 25, will obtain the requested data either from one or more of a plurality of sensors or from associated memory. The instructing signals supplied by the central processor, and the data forwarded by the remote processor are all carried by a single-wire communication link provided by cable 21. Additionally, this cable acts as a power line for sensor unit 9. That is, during one half cycle the sensor unit will be supplied power, if required, while in the alternate half cycle information transfer occurs. Alternative power/communication protocols are utilised in other embodiments.

Controller 10 is provided a signal indicative of the load current. For currents up to approximately 450 A a current transformer having a turns ratio of 1200/1 is suitable to provide a signal compatible with the controller inputs. In this configuration any current transformers use a common earth connection. Most preferably, two transformers provide respective signals to appropriate inputs of controller 10.

The secondary current of the current transformers develop voltages across respective resistor/diode burden networks which enables three ranges per measured phase. In one preferred embodiment burden resistors of 1 Ohm, 7 Ohm and 56 Ohm are connected in series to give 1:8:64 measurement ranges. Voltages across the two larger resistors are limited by respective back-to-back diodes which prevents excessive power dissipation in the burden network. The maximum continuous current sustainable by the network is about 2 Amps. However, 5 Amp surges having a duration of less than about one second can be accommodated without damage being sustained.

The voltage developed across the burden network is fed via R-C filters to appropriate inputs of controller 10. Accordingly, rectification and range selection is selected by operation of software which reduces the amount and complexity of the hardware required.

Controller 10 is also configured to detect earth leakage. In one embodiment a suitable earth leakage toroid of 355/1 or 260/1 ratio, depending upon the physical size required, provides a voltage to the controller. The secondary terminals of the toroid must include a fault limiting network if there is no earth fault restriction. The toroid is connected to controller 10 via an R-C filter and, as above, rectification is performed by the software.

Sensor unit 9 includes a number of inputs which receive signals which are indicative of predetermined load parameters such as temperature, earth continuity and the like. Preferably, sensor unit 9 is also configured to detect an out of balance load. A suitable sensor includes a 355/1 or 260/1 earth leakage toroid, which supplies current to a suitable burden network. The voltage across this network is made available to sensor unit 9. This arrangement will allow controller 10, in the event of an earth fault, to differentiate between a fault in the load or a fault in the connecting cables.

Controller 10, either directly or indirectly through sensor unit 9, obtains sufficient information about both the initial and normal operating parameters of the load 4. This system makes possible the control of switch gear 2 in response to conditions such as overload, short circuit, single phasing, undercurrent, locked rotor, earth leakage, frozen contactor/loss of vacuum, earth fault lockout, earth continuity, and temperature variations.

The module 1 is advantageously configured to display all the available information about the load status either automatically or as requested by an operator.

On power up controller 10 carries out a self test procedure which includes:

checking RAM memory;

check peripheral items, if any;

ensure output relays are off; and energise the current transformer and earth leakage test relay and check all current sensing inputs.

Following these tests the controller will commence communications with sensor unit 9. If the controller detects an open circuit or high impedance an appropriate LED is activated to indicate sensor unit failure. Controller 10 will, however, continue to check for a connection with a sensor unit.

When a valid connection is sensed, controller 10 maintains a predetermined voltage on cable 21. Preferably, this voltage is the maximum negative voltage, which is maintained for a length of time to allow the transfer of sufficient power to sensor unit 9. In one particular embodiment the sensor unit will notify the controller when sufficient power storage has occurred by pulling the applied negative voltage to ground. In a further embodiment, sensor unit 9 sends a serial coded message which may consist of eight or more data bits, a parity check bit and two stop bits. Preferably, this message will relay to controller 10 information about the particular electrical load which is to be supplied via switch gear 2. For example, if the load is an electrical motor the message can convey the power requirements of that motor as well as its starting characteristics.

If a coded message is not received during a predetermined time interval, controller 10 will adopt overcurrent settings. Should the sensor unit subsequently provide a message consistent with these settings the control module 1 is ready for controlling and monitoring switch gear 2. If, however, the message received from sensor unit 9 does not accord with the settings provided by the controller a warning LED is activated. An operator must then check that the settings are not applicable to the load. The settings suggested by the controller are displayed on the LCD display or by appropriate LED's. If required, a reset button can be depressed and the controller will adopt the overload settings provided by sensor unit 9.

When power is not being supplied to the load the controller monitors for any earth faults or frozen contactor conditions. Moreover, the controller also requests information from sensor unit 9 which monitors, for example, winding temperatures.

During the time power is being supplied to the load the controller monitors the current transformers to detect any overloads or earth leakages. The AC voltages developed across the burden networks are amplified and level shifted using a switching amplifier. Controller 10 then software-rectifies and averages the signal, as described above, before obtaining a comparison with the already established overload settings. The controller also periodically requests from sensor unit 9 signals indicative of winding or other relevant temperatures to ensure that over-heating is avoided.

Both the sensor unit 9 and controller 10 are configured to receive analogue and digital signals. However, in order to provide sufficient speed of operation these devices must be able to make all inputs available for subsequent decision making purposes within about 1 msec. Insofar as the analogue signals are concerned this requires a reasonably fast analogue to digital converter because the resultant signals, in some circumstances, must also be compared, averaged or the like. Preferably also, any port servicing and other house keeping functions are also performed within this time interval.

The outputs of controller 10 preferably drive relays, as described above. The test relays are switched by open-collector transistors having generous current, voltage and gain ratings to provide a large safety factor. That output providing a signal to the switch gear also drives a relay, which during normal operation will be continually energised. In the event that load 4 is required to be isolated from source 3, controller 10 will deactivate that relay. Accordingly, if there should be any failure of the controller 10, due to lock-up or otherwise, the switch gear will be opened. In this embodiment the controller also includes additional sensing means which provide a signal should this relay mechanically fail in the "on" state.

Although the module 1 includes some emergency power backup to cater for severe drops in the supply voltage, this stored energy will be reduced to safe levels within thirty seconds of total power loss.

Module 1 provides a single controller for switch gear 2. The module allows protection of equipment and personnel in circumstances where overcurrent, short circuits and earth or cable fault conditions exist. This central control function is complemented by the remote sensor unit which provides requested information about the load. Accordingly, switch gear 2 can be operated safely by controller 10 irrespective of the load being supplied. That is, controller 10 does not have characteristic settings on the protection relay, but communicates with sensor unit 9 to obtain the required protection information so that the protection relay is set for each particular load.

Initially, operating parameters of the load, such as maximum current capacity, starting characteristics or the like, are obtained by the controller. Thereafter, the controller gathers data about the load behaviour and conditions. This data can be obtained either directly by controller 10, or indirectly via sensor unit 9. The data is used to provide a basis for monitoring the load. Should the data obtained be inconsistent with the initial parameters, the load will be electrically isolated from power source 3.

In this preferred embodiment the single-wire communication cable 21 allows sensor unit 9 to be powered during the negative half cycle, while commands sent by the controller to unit 9 will occur in the positive half cycle. As described above, the sensor unit communicates with controller 10 by switching the voltage supplied in the negative half cycle to ground.

In some embodiments sensor unit 9 includes at least one digital input to allow operation as a remote input device for a control and/or supervisory system.

Although the invention has been described with reference to a particular example, it will be appreciated by those skilled in the art that the invention may be embodied in many other forms.

We claim:

1. A load control module for controlling switch gear which, in use, connects a power source to a remotely located electrical load, the module including:

a sensor unit associated with the load for providing a first signal indicative of predetermined operating parameters of the load and for subsequently periodically providing a third signal indicative of predetermined load conditions;

a controller for receiving the first and third signals and for selectively providing a second signal to the switch gear to isolate the load from the power source when the load or the load conditions do not comply with the parameters; and a protective housing in which the switch gear and the controller are located, the sensor unit and load being disposed outside the housing.

2. The load control module according to claim 1 wherein the sensor unit provides the third signal when requested by the controller.

3. The load control module according to claim 1 wherein the controller includes means for detecting earth leakage faults.

4. A load control module for controlling switch gear which, in use, connects a power source to a remotely located electrical load, the module including:

a sensor unit associated with the load for providing a first signal indicative of predetermined operating parameters of the load; and a controller for receiving the first signal and for selectively providing a second signal to the switch gear to isolate the load from the power source when the load does not comply with the parameters, wherein the controller and sensor unit communicate through a single wire communication link that also supplies power to the sensor unit.

5. The load control module according to claim 4 wherein the switch gear selectively connects the power source to the load via a power cable, the cable including the communication link.

6. A load control module for controlling switch gear which, in use, connects a power source to a remotely located electrical load, the module including:

a sensor unit associated with the load for providing a first signal indicative of predetermined operating parameters of the load and for subsequently periodically providing a third signal indicative of predetermined load conditions; and a controller for receiving the first and third signals and for selectively providing a second signal to the switch gear to isolate the load from the power source when the load or the load conditions do not comply with the parameters.

7. The load control module according to claim 6 wherein the sensor unit provides the third signal when requested by the controller.

* * * * *